(12) United States Patent
Miki

(10) Patent No.: US 10,305,096 B2
(45) Date of Patent: May 28, 2019

(54) METHOD FOR PRODUCING ELECTRODE ACTIVE MATERIAL AND ELECTRODE ACTIVE MATERIAL

(71) Applicant: TOYOTA JIDOSHA KABUSHIKI KAISHA, Toyota-shi, Aichi (JP)

(72) Inventor: Nariaki Miki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/559,376

(22) Filed: Dec. 3, 2014

(65) Prior Publication Data

US 2015/0110951 A1 Apr. 23, 2015

Related U.S. Application Data

(62) Division of application No. 14/113,744, filed as application No. PCT/JP2011/068137 on Aug. 9, 2011, now abandoned.

(30) Foreign Application Priority Data

Jun. 1, 2011 (JP) .................................. 2011-123037

(51) Int. Cl.
*H01M 4/00* (2006.01)
*H01M 4/36* (2006.01)
(Continued)

(52) U.S. Cl.
CPC ......... *H01M 4/366* (2013.01); *H01M 4/0402* (2013.01); *H01M 4/505* (2013.01);
(Continued)

(58) Field of Classification Search
CPC ........... Y02P 70/00; H01M 4/00; Y02E 60/00
See application file for complete search history.

(56) References Cited

U.S. PATENT DOCUMENTS 4,477,580 A * 10/1984 Fleming, Jr. .......... C03B 37/016
501/12
5,321,544 A * 6/1994 Parkhe .................... G02F 1/157
359/265
(Continued)

FOREIGN PATENT DOCUMENTS

JP A-09-086931 3/1997
JP A-10-233213 9/1998
(Continued)

OTHER PUBLICATIONS

"Investigation of sol-gel route in the synthesis of lithium ion conducting glasses", N. Satyanarayanaa, P. Muralidharan, R. Patcheammalle, M. Venkateswarlub, G.Y. Rama Rao, Solid State Ionics, vol. 86-88 (1996) 543-546.*

(Continued)

*Primary Examiner* — David P Turocy
*Assistant Examiner* — Mohammad Mayy
(74) *Attorney, Agent, or Firm* — Oliff PLC

(57) ABSTRACT

The present invention is to provide an electrode active material and a method for producing the same capable of preventing production of foreign substance, poor coating and deterioration of electrode active material upon covering the surface of the electrode active material with ion conductive oxide, decreasing battery resistance and having higher output of battery. Disclosed is a method for producing an electrode active material, the surface of which is covered with ion conductive oxide, comprising the steps of: preparing an alkoxide solution by mixing at least alkoxide compound and liquid water; and applying and drying the alkoxide solution on a surface of an electrode active material under dry atmosphere, and an electrode active material, the surface of which is covered with ion conductive oxide, wherein an area on the surface of the electrode active (Continued)

material occupied by a substance other than the ion conductive oxide is 21% or less.

5 Claims, 6 Drawing Sheets

(51) Int. Cl.
    *H01M 4/505*     (2010.01)
    *H01M 4/525*     (2010.01)
    *H01M 4/04*     (2006.01)

(52) U.S. Cl.
    CPC ............ *H01M 4/525* (2013.01); *Y02E 60/00* (2013.01); *Y02P 70/00* (2015.11)

(56) References Cited

U.S. PATENT DOCUMENTS

| | | | |
|---|---|---|---|
| 5,618,640 A * | 4/1997 | Idota | H01M 4/485 419/1 |
| 6,531,220 B1 * | 3/2003 | Kweon | H01M 4/366 428/402 |
| 6,911,280 B1 * | 6/2005 | De Jonghe | C03C 17/245 429/137 |
| 6,962,666 B2 * | 11/2005 | Ravet | 252/506 |
| 7,105,253 B2 | 9/2006 | Jito et al. | |
| 2005/0003277 A1 * | 1/2005 | Lee | H01M 4/13 429/322 |
| 2005/0133477 A1 | 6/2005 | Esseian | |
| 2009/0081554 A1 | 3/2009 | Takada et al. | |
| 2010/0143806 A1 * | 6/2010 | Dietz | C07F 5/022 429/338 |

FOREIGN PATENT DOCUMENTS

| | | |
|---|---|---|
| JP | A-10-316426 | 12/1998 |
| JP | A-2010-170715 | 8/2010 |
| JP | A-2010-244847 | 10/2010 |
| JP | A-2010-248044 | 11/2010 |
| JP | A-2011-065887 | 3/2011 |
| WO | WO 2007/004590 A1 | 1/2007 |

OTHER PUBLICATIONS

JP 2001185146 A, english translate.*
Hirano et al.; Preparation of Stoichiometric Crystalline Lithium Niobate Fibers by Sol-Gel Processing with Metal Alkoxides; J. Am. Ceram. Soc.; 1989; pp. 707-709; vol. 72; No. 4.
Jan. 29, 2015 Office Action issued in U.S. Appl. No. 14/113,744.

* cited by examiner (A) Example 1

(B) Example 2

(C) Comparative example 1

METHOD FOR PRODUCING ELECTRODE ACTIVE MATERIAL AND ELECTRODE ACTIVE MATERIAL

This is a Divisional of application Ser. No. 14/113,744 filed Oct. 24, 2013, which in turn is a National Phase of PCT/JE2011/068137 filed Aug. 9, 2011, which claims the benefit of Japanese Patent Application No. 2011-123037 filed Jun. 1, 2011. The disclosures of the prior applications are hereby incorporated by reference herein in their entirety.

TECHNICAL FIELD

The present invention relates to a method for producing an electrode active material and the electrode active material.

BACKGROUND ART

In recent years, with the rapid spread of IT-related devices and communication devices such as a personal computer, a video camera and a cellular phone, emphasis is placed on the development of batteries used as the power source for such devices. In the automobile industry, the development of batteries with high output and high capacity for electric vehicles and hybrid vehicles has been promoted. Among various kinds of batteries, a lithium battery attracts attention due to its high energy density and output.

A lithium battery generally has a positive electrode comprising a positive electrode active material layer, a negative electrode comprising a negative electrode active material layer, and an electrolyte present between the electrodes. In addition, it has a positive electrode collector, which collects current from the positive electrode active material layer, and a negative electrode collector, which collects current from the negative electrode active material layer, as needed.

A lithium battery which uses a combustible organic electrolytic solution as the electrolyte provided between the positive electrode active material layer and the negative electrode active material layer requires safety measures against leakage, short circuits, overcharging, etc. Especially, batteries with high output and high capacity are required to achieve further improvement in safety. Therefore, research and development of all-solid-state batteries have been promoted, such as an all-solid-state lithium secondary battery using a solid electrolyte such as a sulfide- or oxide-based solid electrolyte as the electrolyte.

Concerning all-solid-state batteries, particularly all-solid-state lithium batteries, it has been known that by covering the surface of an electrode active material, particularly a positive electrode active material, with other components, deterioration of electrode active materials can be prevented and stability of electrode active materials can be improved.

For example, Patent Literature 1 discloses an all-solid-state lithium battery using a lithium ion conductive solid electrolyte mainly comprising a sulfide, wherein the surface of a positive electrode active material is covered with a lithium ion conductive oxide. In Patent Literature 1, the surface of the positive electrode active material is covered by the lithium ion conductive oxide in such a manner that: a positive electrode active material powder was charged in a falling fluidized coating machine to form a fluidized bed of the powder, and an alkoxide solution containing lithium and titanium was sprayed, followed by hydrolysis of an alkoxide using moisture in the air and heating.

CITATION LIST

Patent Literature

[Patent Literature 1] WO2007/004590

SUMMARY OF INVENTION

Technical Problem

As a result of diligent researches, the inventors of the present invention have found out that in the case of hydrolysis of an alkoxide by moisture in the air as disclosed in Patent Literature 1, there are problems in the coating step such as deterioration of electrode active materials, production of products (hereinafter, it may be referred to as foreign substances) due to excessive development of hydrolysis, and poor coating due to decrease in flowability of electrode active material powder. This is because the amount of moisture, moisture supply rate, etc. cannot be controlled in the case of hydrolysis using moisture in the air. In batteries using the electrode active material with such problems, foreign substances produced on the surface of the electrode active material may inhibit migrating ions and electrons from moving, and a high resistance layer may be formed as sulfide-based solid electrolytes cause a side reaction with the surface of the electrode active material where a coating layer is not formed. Due to these, the capacity and output of battery decrease.

The present invention was achieved in light of the above circumstances, and an object of the present invention is to provide a method for producing an electrode active material and the electrode active material capable of preventing production of foreign substances, poor coating, and deterioration of electrode active materials upon coating the surface of the electrode active material with ion conductive oxides, decreasing battery resistance, and providing higher output of batteries.

Solution to Problem

A first method of producing an electrode active material of the present invention is a method for producing an electrode active material, a surface of which is covered with an ion conductive oxide, comprising the steps of:

a preparation step including preparing an alkoxide solution by mixing at least an alkoxide compound and liquid water; and a coating step including applying and drying the alkoxide solution on the surface of the electrode active material under a dry atmosphere.

According to the first production method of the present invention, the amount of water required for the hydrolysis of the alkoxide compound can be controlled. Hence, deterioration of electrode active materials can be prevented, and an excellent coating layer having production of foreign substances on the surface of the electrode active material and poor surface coating prevented can be formed.

In the first production method, the dry atmosphere in the coating step preferably has a dew-point temperature of −30° C. or less.

It is preferable that the amount of the liquid water in the alkoxide solution is an amount that a number of water molecule is 1 to 10 times of a unit number of RO$^-$, wherein R is an organic group, in the alkoxide compound.

In the first production method, in the case that the ion conductive oxide is lithium niobate, the following (1) or (2)

is preferably performed in the preparation step including preparing the alkoxide solution:

(1) mixing an alcohol aqueous solution containing an alcohol and the liquid water with a lithium alkoxide and a niobium alkoxide, or (2) after mixing the liquid water with a lithium alkoxide alcohol solution containing a lithium alkozide and an alcohol, mixing a niobium alkoxide therewith.

This is because precipitation of the lithium alkoxide and the niobium alkoxide being raw materials of lithium niobate in the alkoxide solution can be prevent, and a uniform coating layer can be formed on the surface of the active material.

Particularly, an amount of the liquid water in the alkoxide solution preferably satisfies Y≤0.3676X+0.2, wherein the amount of the liquid water is Y (mol/kg), and a concentration of lithium niobate produced in the alkoxide solution is X (mol/kg). Thereby, clouding precipitation formation in the alkoxide solution due to excessive development of hydrolysis and dehydrating condensation can be prevent, and the alkoxide solution excellent in applicability onto the surface of the active material can be prepared.

A second method of producing an electrode active material of the present invention is a method for producing an electrode active material, a surface of which is covered with an ion conductive oxide, comprising the steps of:

a preparation step including preparing an alkoxide solution by mixing at least an alkozide compound with a solute having at least one of hydrated water and surface adsorption water; and a coating step including applying and drying the alkoxide solution on the surface of the electrode active material under a dry atmosphere.

According to the second production method of the present invention, similarly as the first production method, the amount of water required for hydrolysis of the alkoxide compound can be controlled. Hence, deterioration of electrode active materials can be prevented, and an excellent coating layer having production of foreign substances on the surface of the electrode active material and poor surface coating prevented can be formed.

In the second production method, the dry atmosphere in the coating step preferably has a dew-point temperature of −30° C. or less.

It is preferable that a total amount of the hydrated water and the surface adsorption water in the alkoxide solution is an amount that a number of water molecule is 1 to 10 times of a unit number of $RO^-$, wherein R is an organic group, in the alkoxide compound.

The electrode active material of the present invention is an electrode active material, a surface of which is covered with an ion conductive oxide, wherein an area of the surface of the electrode active material occupied by a substance other than the ion conductive oxide is 21% or less.

Since the electrode active material of the present invention has only a small amount of foreign substances other than the ion conductive oxide on the surface, battery resistance can be decreased and higher output can be realized.

Advantageous Effects of Invention

According to the present invention, an electrode active material capable of decreasing battery resistance and realizing higher battery output can be provided, since production of foreign substances other than the ion conductive oxide and poor coating of ion conductive oxides on the surface of the electrode active material can be prevented, and deterioration of electrode active materials upon the coating treatment can be prevented.

DESCRIPTION OF EMBODIMENTS

Figure 1:
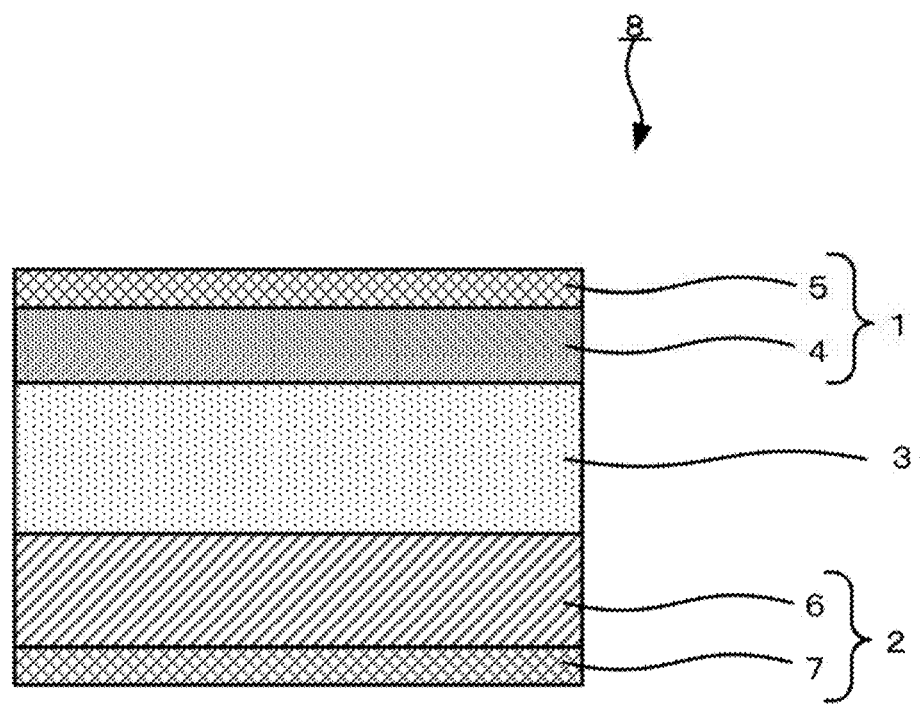
FIG. 1 is a sectional view of an example of embodiment of an all-solid-state battery.

The first method of producing an electrode active material of the present invention is a method for producing an electrode active material, the surface of which is covered with an ion conductive oxide, comprising the steps of:

a preparation step including preparing an alkoxide solution by mixing at least an alkoxide compound and liquid water; and a coating step including applying and drying the alkoxide solution on the surface of the electrode active material under a dry atmosphere.

The second method of producing an electrode active material of the present invention is a method for producing an electrode active material, the surface of which is covered with an ion conductive oxide, comprising the steps of:

a preparation step including preparing an alkoxide solution by mixing at least an alkoxide compound with a solute having at least one of hydrated water and surface adsorption water; and a coating step including applying and drying the alkoxide solution on the surface of the electrode active material under a dry atmosphere.

The method for producing the electrode active material of the present invention allows the surface of electrode active material to be coated with the ion conductive oxide by oxidizing a hydrolysate (hydroxide) of the alkoxide on the surface of the electrode active material. Typically, the ion conductive oxide coated layer is formed on the surface of the electrode active material by a sol-gel method. That is, an alkoxide hydrolysate sol is gelated on the surface of the electrode active material, the gel is heated, and the oxide (ion conductive oxide) layer is formed.

While conventionally, the hydrolysis of an alkoxide on the surface of electrode active material has been caused using moisture in the air (humidity), the present invention is characterized mainly in containing moisture for hydrolysis of the alkoxide compound in the alkoxide solution prepared using the alkoxide compound, and selecting a dry atmosphere upon applying and drying the alkoxide solution on the surface of the electrode active material.

By selecting a dry atmosphere upon applying and drying the alkoxide solution and containing moisture in the alkoxide solution as aforementioned, the moisture amount upon hydrolysis of the alkoxide compound can be controlled. Hence, in comparison to conventional cases utilizing humidity in the air, excessive development of hydrolysis can be prevented. As a result, production of foreign substances other than the objective product (ion conductive oxide) on the surface of the electrode active material can be prevented. Moreover, since the moisture amount contacting the electrode active material can be lower than conventional cases, deterioration and decrease in flowability of electrode active materials due to contact with water can be prevented. By preventing decrease in flowability of electrode active materials, poor coating of ion conductive oxides onto the surface of the electrode active material can be prevented. Poor coating causes a side reaction between exposed electrode active material and other components, for example, a sulfide-based solid electrolyte, and production of high resistance substances, which may cause decrease in battery performance.

In the present invention, water is added to the alkoxide solution by any of addition of liquid water (the first production method), and addition of a solute having at least one of hydrated water and surface adsorption water (the second production method).

Hereinafter, each step of the production method of the present invention will be explained in the order of the first production method and the second production method.

(First Production Method)
(Preparation Step)

The preparation step includes preparing an alkoxide solution by mixing at least an alkoxide compound and liquid water.

The alkoxide compound becomes a hydroxide (a precursor of ion conductive oxide) by hydrolysis, and can be appropriately selected according to the ion conductive oxide covering the surface of the electrode active material.

Examples of the ion conductive oxide preferably include oxides containing at least one kind selected from the group consisting of group-III to group-VI elements and group-XIII to group-XV elements as a material element. Among them, lithium complex oxides containing at least one of these elements and lithium are more preferable.

Specifically, oxides containing at least one kind selected from the group consisting of B, Si, Ti, Zr, V, P, Al, Nb, Ta, Cr, Mo and W among group-III to group-VI elements and group-XIII to group-XV elements are preferable. Lithium complex oxides containing at least one kind of these elements in the above group and lithium are more preferable.

More specifically, examples of the ion conductive oxides include oxide glass such as lithium silicate, lithium borate, lithium phosphate, lithium titanate, lithium niobate and lithium tungstate, and mixtures thereof.

In addition, any of oxide-based solid electrolytes among solid electrolytes used for all-solid-state batteries can be used as the ion conductive oxide covering the electrode active material. Specifically, examples thereof include oxide-based amorphous solid electrolytes such as $Li_2O$—$B_2O_3$—$P_2O_5$, $Li_2O$—$SiO_2$, $Li_2O$—$B_2O_3$ and $Li_2O$—$B_2O_3$—$ZnO$, and crystalline oxides such as $LiI$—$Al_2O_3$, $Li_5La_3Ta_2O_{12}$, $Li_7La_3Zr_2O_{12}$ and $Li_6BaLa_2Ta_2O_{12}$.

The alkoxide solution is prepared using an alkoxide compound containing a material element (examples thereof include group-III to VI elements, group-XIII to XV elements and lithium element) contained in the ion conductive oxide. The alkoxide compound used for preparation of the alkoxide solution may contain at least one kind of material element constituting the ion conductive oxide, and not all material elements are necessarily added as the alkozide compound. That is, at least one kind of alkoxide compound is used as a material element compound in the present invention.

A specific material element compound is appropriately selected according to ion conductive oxide species covering the surface of the electrode active material. A plurality of solutions containing different material elements may be mixed, or different material element ions may be added to produce a multicomponent oxide.

Examples of lithium compound usable as a lithium source include lithium acetate, lithium alkoxides and lithium hydroxides. The alkoxide group of lithium alkoxide preferably has, for example, 1 to 4 carbons. Specific examples thereof include methoxylithium, ethoxylithium and propoxylithium.

Examples of boron compound usable as a boron source include boric acid, trimethoxyboron, triethoxyboron, tri-i-propoxyboron and tri-n-propoxyboron.

Examples of silicon compound usable as a silicon source include tetraethoxysilane (TEOS), tetramethoxysilane, tetra-i-propoxysilane, tetra-n-propoxysilane, tetra-i-butoxysilane, tetra-n-butoxysilane and tetra-t-butoxysilane.

As a solvent of the alkoxide solution, any solvent which can dissolve or disperse the material element compound may be used. Examples thereof include alcohols such as ethanol, methanol and propanol.

For example, in the case of coating the electrode active material with the ion conductive oxide consisting of mixed glass of lithium borate glass and lithium silicate glass, an alkoxide solution using boric acid as the boron source, TEOS as the silicon source, anhydrous lithium acetate as the lithium source and ethanol as the solvent, and containing liquid water is preferable, from the viewpoint of the reactivity of materials.

In the case of coating with the ion conductive oxide containing a plurality of material elements, the ratio of material elements in the alkozide solution is appropriately determined according to the ion conductive oxide.

The amount of liquid water added to the alkoxide solution may be at least an amount that the number of water molecules is the same as the unit number of $RO^-$ (R is an organic group) in all alkoxide compounds added to the alkoxide solution. However, in order to sufficiently prevent excessive development of hydrolysis reaction, deterioration of electrode active materials and decrease in flowability of electrode active materials, it is preferable that the amount of liquid water added to the alkoxide solution is an amount that the number of water molecules is 1 to 10 times, preferably 5 to 7 times, of the unit number of $RO^-$ in the alkoxide compound in the alkoxide solution.

The amount of solvent in the alkoxide solution may be appropriately set taking the applicability of the solution to the surface of the electrode active material, the viscosity of the solution and the reaction rate of hydrolysis into consideration. For example, the amount of solvent in the alkoxide solution is preferably set so that the percentage of solid content of alkoxide solution is 3 to 9 wt %.

The preparation method of the alkoxide solution is not particularly limited. From the viewpoint of uniform mixture of each material, it is preferable to prepare the alkoxide solution by mixing each material compound with a solvent to prepare a solution of each material compound, and mixing the material compound solutions. The liquid water may be added to any of the material compound solution or to a mixed solution of a plurality of material compound solutions being mixed.

The alkoxide solution may be cooled in its preparation or in the coating step hereinafter described to adjust (decrease) the hydrolysis rate.

In the case that the alkoxide solution is prepared using a lithium alkoxide and a niobium alkoxide in order to coat the surface of the electrode active material with lithium niobate ($LiNbO_3$, ion conductive oxide), it is preferable to prepare the alkoxide solution according to the following step (1) or (2) in the preparation step: (1) mixing an alcohol aqueous solution containing an alcohol and liquid water with a lithium alkoxide and a niobium alkoxide, or (2) after mixing liquid water with a lithium alkoxide alcohol solution containing a lithium alkoxide and an alcohol, mixing a niobium alkoxide thereto.

As a result of diligent researches, the inventors of the present invention have found out that precipitation is caused when a lithium alkoxide such as ethoxylithium, and a niobium alkoxide such as pentaethoxyniobium are directly mixed with liquid water itself. Presumably, this is because the lithium alkoxide and the niobium alkoxide react with water to produce LiOH and $Nb_2O_5$. As for the niobium alkoxide, the inventors of the present invention has found out that precipitation is also caused when liquid water is added to a niobium alkoxide alcohol solution being a mixture of a niobium alkoxide and an alcohol. If the lithium alkoxide and the niobium alkoxide being raw materials precipitate in the alkoxide solution, there are problems that the production efficiency of lithium niobate being an ion conductive oxide may decrease, and lithium niobate cannot be uniformly coated on the surface of the active material.

The inventors of the present invention has found out that in the case of coating lithium niobate on the surface of the active material using the lithium alkoxide and the niobium alkoxide for raw materials of the alkoxide solution, formation of the precipitation can be prevented by adjusting the order of mixing the lithium alkoxide and the niobium alkoxide with liquid water, and the condition of lithium alkoxide and niobium alkoxide upon mixing with liquid water.

Examples of the step (1) include: after preparing an alcohol aqueous solution by mixing an alcohol and liquid water and adding a lithium alkoxide to the alcohol aqueous solution, a niobium alkozide is added thereto; and after preparing an alcohol aqueous solution by mixing an alcohol and liquid water and adding a niobium alkoxide to the alcohol aqueous solution, a lithium alkoxide is added thereto.

Examples of the step (2) include: after adding a lithium alkoxide to an alcohol and adding liquid water to the lithium alkoxide alcohol solution, a niobium alkoxide is added thereto.

It can be avoided by the above procedures (1) and (2) to mix the lithium alkoxide itself with liquid water itself, to mix the niobium alkoxide itself with liquid water itself, and to mix the niobium alkoxide alcohol solution with liquid water.

In preparation of the aforementioned alkoxide solution using the lithium alkoxide and the niobium alkoxide, the amount of the liquid water Y (mol/kg) in the alkoxide solution preferably satisfies $Y \leq 0.3676X + 0.2$, wherein the concentration of lithium niobate produced in the alkoxide solution is X (mol/kg).

As a result of diligent researches, the inventors of the present invention has found out that, upon preparation of the alkoxide solution using the lithium alkoxide and the niobium alkoxide, not by adding the above-described liquid water "having the number of water molecules the same as the unit number of $RO^-$ in all alkoxide compounds added to the alkoxide solution" but by adding the liquid water satisfying the above formula, excessive development of hydrolysis and dehydrating condensation in the alkoxide solution can be prevented, and as a result, clouding precipitation can be prevented. Such a precipitated and clouded alkoxide solution is inferior in applicability to the surface of the active material, and difficult to form a uniform ion conductive oxide coated layer on the surface of the active material. To the contrary, by using the liquid water in the amount satisfying the above formula, the clouding precipitation of the alkoxide solution can be prevented and the ion conductive oxide coated layer can be uniformly formed on the surface of the active material.

Herein, the concentration X of lithium niobate produced in the alkoxide solution refers to a value obtained by dividing the theoretical yield (mol) of lithium niobate calculated from the amounts of lithium alkoxide and niobium alkoxide used for preparing the alkoxide solution by the total weight (kg) of raw materials of the alkoxide solution.

The alkoxide group of lithium alkoxide preferably has, for example, 1 to 4 carbons. Specific examples include methoxylithium, ethoxylithium and propoxylithium.

The alkoxide group of niobium alkoxide preferably has, for example, 1 to 3 carbons. Specific examples include pentaethoxyniobium, etc.

Examples of alcohol include methanol, ethanol and propanol. The amount of alcohol can be appropriately set taking the applicability of the solution to the surface of the electrode active material, the viscosity of the solution, the reaction rate of hydrolysis, etc. into consideration. For example, the amount of alcohol is preferably set so that the percentage of solid content of the alkoxide solution is 3 to 9 wt %.

(Coating Step)

The coating step is a step including applying and drying the alkoxide solution on the surface of the electrode active material under a dry atmosphere. By applying and drying the alkoxide solution, the surface of the electrode active material is coated with a hydroxide being a hydrolysate of the alkoxide compound. By oxidizing this hydroxide, the surface of the electrode active material is coated with the ion conductive oxide.

Herein, the dry atmosphere means an atmosphere having less amount of moisture than the air, which preferably has a dew-point temperature of −30° C. or less, from the viewpoint of controlling development of hydrolysis.

The coating step is performed at least under the above dry condition, and may be performed under an inert atmosphere using nitrogen gas, argon gas, etc. or an oxygen atmosphere containing oxygen.

The electrode active material being a subject of coating the alkoxide solution is not particularly limited and may be appropriately selected. Examples of electrode active material for lithium secondary batteries include lithium cobaltate ($LiCoO_2$), lithium nickelate ($LiNiO_2$), $Li_{1+x}Ni_{1/3}Mn_{1/3}Co_{1/3}O_2$, lithium manganate ($LiMn_2O_4$), different kind element substituent Li—Mn spinels represented by $Li_{1+x}Mn_{2-x-y}M_yO_4$ (M is at least one kind selected from the group consisting of Al, Mg, Co, Fe, Ni and Zn), lithium titanates ($Li_xTiO_y$), lithium metal phosphates ($LiMPO_4$, wherein M is at least one kind selected from the group consisting of Fe, Mn, Co and Ni), transition metal oxides (for example, vanadium oxide ($V_2O_5$), molybdenum oxide ($MoO_3$), etc.), titanium sulfide ($TiS_2$), carbon materials (for example, graphite, hard carbon, etc.), lithium-cobalt nitride (LiCoN), lithium-silicon oxides ($Li_xSi_yO_z$), lithium metal (Li), lithium alloys (for example, LiM, wherein M is any of Sn, Si, Al, Ge, Sb, P, etc.), lithium storable intermetallic compounds (for example, $Mg_xM$, wherein M is any of Sn, Ge, Sb, etc., and $N_ySb$, wherein N is any of In, Cu, Mn, etc.) and derivatives thereof.

The electrode active material may be a positive electrode active material or a negative electrode active material. There is no clear distinction between positive electrode active material and negative electrode active material. In comparison between charge-discharge potentials of two kinds of compounds, a compound having noble potential is used as a positive electrode and a compound having less noble potential is used as a negative electrode to constitute a battery having a given voltage.

The form of electrode active material is not particularly limited, and may be, for example, a particle form or a thin film form.

In the case of using an electrode active material in a form of particle, the particle diameter of the electrode active material is not particularly limited. The average particle diameter is preferably in the range of 0.1 to 30 μm in order to form a uniform coating layer by a fluidized bed method hereinafter described.

The method for applying the alkoxide solution on the surface of the electrode active material and drying the applied alkoxide solution is respectively not particularly limited, and any known method can be employed. Examples of coating method include a dip coating method, a spray coating method and an impregnating method. Since a uniform coating layer can be formed on the surface of the electrode active material in a form of particle, the fluidized bed method is preferable, in which the electrode active material is fluidized, and then the alkoxide solution is sprayed and dried on the surface of the fluidized electrode active material. Typically in the fluidized bed method, applying and drying the alkoxide solution are simultaneously performed, and by repeated applying and drying, uniform coating is capable. As a device employing such a fluidized bed method, a so-called fluidized bed granulating-coating machine can be used. Specific examples of the machine include Multiplex (product name) manufactured by Powrex Corp. and Flo-coater (product name) manufactured by Freund.

In applying and drying of the fluidized bed method, gas flow is usually caused in a fluidized bed container, and if necessary, a rotor, etc. is rotated in order to fluidize the electrode active material. The conditions of the gas flow, rotation of the rotor, etc. may be appropriately selected and may not be particularly limited. Since the alkoxide solution is usually dried by the gas flow in the fluidized bed container, the gas flow temperature (gas flow temperature) in the container is preferably in the range of 40 to 100° C. from the viewpoint of efficiently drying the alkoxide solution.

The conditions of spraying (applying) the alkoxide solution are not particularly limited. The spray velocity, etc. can be appropriately selected.

The electrode active material coated with the alkoxide solution and dried is sintered, which allows oxidization and conversion of alkoxide hydrolysate covering the surface of the electrode active material into an ion conductive oxide. The conditions of sintering (oxidization) may be appropriately selected, for example, heating at 300 to 500° C. for 0.5 hours or more, preferably for 3 to 10 hours.

(Second Production Method)

The second production method is similar to the first production method except for preparing the alkoxide solution by mixing at least an alkoxide compound with a solute having at least one of hydrated water and surface adsorption water in the preparation step. Herein, the conditions in the second production method different from the first production method, that is, only materials used for preparation of the alkoxide solution in the second production method will be explained.

In the second production method, instead of the liquid water in the first production method, the solute having at least one of hydrated water and surface adsorption water is used to have water contained in the alkoxide solution. Examples of such a solute include the hydrates of material element compound besides alkoxide compounds, and the compounds having surface adsorption water besides alkoxide compounds among the compounds listed as the material element compound in the first production method. Specific examples include hydrates such as lithium acetate dihydrate, lithium hydroxide monohydrate and lithium sulfate hydrates, and compounds which can stably have surface adsorption water in a solid powder state such as boric acid and lithium carbonate.

The alkoxide compound containing at least one kind of material element is essential as the material element compound in the second production method similarly as the first production method.

For example, in the case of coating the electrode active material with the ion conductive oxide consisting of mixed glass of lithium borate glass and lithium silicate glass, an alkoxide solution of boric acid as the boron source, TEOS as the silicon source, lithium acetate dihydrate as the lithium source and ethanol as the solvent being mixed is preferable, from the viewpoint of the reactivity of each material, and the stability of water molecule in the solute (raw material compound) having hydrated water and/or surface adsorption water.

The amount of water derived from the hydrate and surface adsorption water in the alkoxide solution is at least an amount that the number of water molecules is the same as the unit number of $RO^-$ (R is an organic group) in all alkoxide compounds added in the alkoxide solution. However, in order to sufficiently prevent excessive development of hydrolysis reaction, deterioration of electrode active materials and decrease in flowability of electrode active materials, it is preferable that the amount of water derived from the hydrate and surface adsorption water in the alkoxide solution is set to the amount that the number of water molecules is 1 to 10 times, more preferably 5 to 7 times, of the unit number of $RO^-$ in the alkoxide compound in the alkoxide solution.

(Electrode Active Material)

According to the aforementioned production method of the present invention, deterioration of electrode active materials can be prevent, while an excellent coating layer having production of foreign substances and poor coating prevented can be formed on the surface of the electrode active material. Specifically, according to the electrode active material, the surface of which is covered with the ion conductive oxide, provided by the present invention, the area on the surface of the electrode active material occupied by the substance other than the ion conductive oxide (foreign substance) can be kept to 21% or less. Also, the particle diameter of the foreign substance can be smaller than the particle diameter of the foreign substance in the case of using humidity in the air conventionally.

The electrode active material provided by the present invention can be suitably used as the active material constituting the positive electrode and negative electrode of various batteries. Particularly, the electrode active material of the present invention exhibits an excellent effect when used as an electrode active material, preferably a positive electrode active material, of a lithium battery.

Herein, a battery, mainly an all-solid-state lithium battery, using the electrode active material of the present invention will be explained.

FIG. 1 shows an example of embodiment of an all-solid-state battery. FIG. 1 is a sectional view of the all-solid-state battery.

In all-solid-state battery 8 shown in FIG. 1, positive electrode 1, negative electrode 2 and solid electrolyte layer 3 are disposed so that solid electrolyte layer 3 is present between positive electrode 1 and negative electrode 2.

Positive electrode 1 comprises positive electrode active material layer 4 and positive electrode collector 5, which collects current from positive electrode active material layer 4. Negative electrode 2 comprises negative electrode active material layer 6 and negative electrode collector 7, which collects current from negative electrode active material layer 6.

The negative electrode contains a negative electrode active material capable of releasing and taking migrating ions (for example, lithium ions). The negative electrode usually have the negative electrode active material layer at least containing a negative electrode active material, and further comprises, if needed, the negative electrode collector, which collects current from the negative electrode active material layer.

The kind of negative electrode active material varies according to the kind of battery. Examples of negative electrode active material for lithium batteries include the electrode active material of the present invention and the substances exemplified above as the electrode active material being the subject of coating the alkoxide solution.

The negative electrode active material layer may contain the negative electrode active material alone, or may contain a binder, a conducting material, an electrolyte, etc. in addition to the negative electrode active material. For example, in the case that the negative electrode active material is in a film form, the negative electrode layer containing the negative electrode active material alone may be formed. On the other hand, in the case that the negative electrode active material is in a powder form, the negative electrode layer can contain the binder besides the negative electrode active material.

The binder is not particularly limited. Examples thereof include polyvinylidene fluoride (PVDF), polytetrafluoroethylene (PTFE) and styrene-butadiene rubber (SBR).

The conducting material is not particularly limited as long as it has conductivity, for example, a carbon material. Examples of carbon material include carbon black, activated carbon, carbon fiber (for example, carbon nanotube, carbon nanofiber, etc.) and graphite.

As for the electrolyte, for example, any of solid electrolytes hereinafter mentioned can be similarly used.

The material of negative electrode collector is not particularly limited as long as it has conductivity. Examples thereof include copper, stainless steel, nickel and carbon. Examples of the form of the negative electrode collector include a foil form, a plate form and a mesh (grid) form. In the case of using a porous collector in a mesh form, etc., the collector may be disposed inside the negative electrode active material layer. The battery case may additionally have the function of the negative electrode collector.

The positive electrode contains the positive electrode active material capable of releasing and taking migrating ions (for example, lithium ions). The positive electrode usually have the positive electrode active material layer at least containing a positive electrode active material, and further comprises, if needed, the positive electrode collector, which collects current from the positive electrode active material layer.

The kind of positive electrode active material varies according to the kind of battery. Examples of positive electrode active material for lithium batteries include the electrode active material of the present invention and the substances exemplified above as the electrode active material being the subject of coating the alkoxide solution.

Similarly as the negative electrode active material layer, the positive electrode active material layer may contain the positive electrode active material alone, or may contain a conducting material, a binder, an electrolyte, an electrode catalyst, etc. in addition to the positive electrode active material. As for the conducting material, binder and electrolyte of the positive electrode active material, the materials for the negative electrode active material layer may be similarly used and thus will not be described here.

The material of positive electrode collector is not particularly limited as long as it has conductivity. Examples thereof include stainless steel, nickel, aluminium, iron, titanium and carbon. Examples of the form of the positive electrode collector include a foil form, a plate form and a mesh (grid) form. In the case of using a porous collector in a mesh form, etc., the collector may be disposed inside the positive electrode active material layer. The battery case may additionally have the function of the positive electrode collector.

The solid electrolyte layer contains at least a solid electrolyte which enables migrating ion conduction between the positive electrode and the negative electrode. The solid electrolyte may be appropriately selected according to the migrating ion species (for example, lithium ion). Examples thereof include an amorphous material (glass material), a crystal and glass ceramics of oxide-based solid electrolyte and those of sulfide-based solid electrolyte.

Specific examples of the solid electrolyte usable for lithium batteries include oxide-based amorphous solid electrolytes such as $Li_2O-B_2O_3-P_2O_5$, $Li_2O-SiO_2$, $Li_2O-B_2O_3$ and $Li_2O-B_2O_3-ZnO$; sulfide-based amorphous solid electrolytes such as $Li_2S-SiS_2$, $LiI-Li_2S-SiS_2$, $LiI-Li_2S-P_2S_5$, $LiI-Li_2S-B_2S_3$, $Li_3PO_4-Li_2S-Si_2S$, $Li_3PO_4-Li_2S-SiS_2$, $LiPO_4-Li_2S-SiS$, $LiI-Li_2S-P_2O_5$, $LiI-Li_3PO_4-P_2S_5$ and $Li_2S-P_2S_5$; crystalline oxides and crystalline oxynitrides such as LiI, $LiI-Al_2O_3$, $Li_3N$, $Li_3N-LiI-LiOH$, $Li_{1.3}Al_{0.3}Ti_{0.7}(PO_4)_3$, $Li_{1+x+y}A_xTi_{2-x}Si_yP_{3-y}O_{12}$ (A=Al or Ga; $0 \leq x \leq 0.4$; $0 < Y \leq 0.6$), $[(B_{1/2}Li_{1/2})_{1-z}C_z]TiO_3$ (B is at least one kind selected from La, Pr, Nd and Sm; C=Sr or Ba; $0 \leq z \leq 0.5$), $Li_5La_3Ta_2O_{12}$, $Li_7La_3Zr_2O_{12}$, $Li_6BaLa_2Ta_2O_{12}$, $Li_3PO_{(4-3/2w)}Nw$ (w<1) and $Li_{3.6}Si_{0.6}P_{0.4}O_4$.

The solid electrolyte layer may contain other components if needed such as a binder, a plasticizer, etc. besides the solid electrolyte.

Examples of the binder include polyvinyl alcohol (PVA), polyvinyl butyral (PVB), polyvinylidene fluoride (PVDF), polytetrafluoroethylene (PTFE) and styrene-butadiene rubber (SBR).

The ratio of the solid electrolyte and other components in the solid electrolyte layer is not particularly limited and may be appropriately decided.

The production method of all-solid-state battery is not particularly limited. For example, the negative electrode active material layer, the positive electrode active material layer and the solid electrolyte layer can be formed by hot pressing the negative electrode material at least containing the negative electrode active material, the positive electrode material containing at least the positive electrode active material and the electrolyte material at least containing the solid electrolyte respectively.

Alternatively, a slurry of negative electrode material, a slurry of positive electrode material and a slurry of electrolyte material are respectively applied on a substrate, dried and, if required, subjected to a heat treatment. Thereby, the negative electrode active material layer, the positive electrode active material layer and the solid electrolyte layer can be formed respectively. Herein, as the substrate, it is possible to use a carrier sheet or a member which is adjacent to the negative electrode active material layer, the positive electrode active material layer or the solid electrolyte layer in the all-solid-state battery. Herein, the member which is adjacent to the negative electrode active material layer, the positive electrode active material layer or the solid electrolyte layer is, for example, the collector of the electrode active material layer, the solid electrolyte layer, etc. in the case of the positive or negative electrode active material layer, and the positive or negative electrode active material layer in the case of the solid electrolyte layer.

The all-solid-state battery can be formed by stacking the above layers in an appropriate order. After stacking, a pressing treatment and a heating treatment may be performed, if required.

Herein, the battery comprising the electrolyte layer having the solid electrolyte is explained as an example. However, as the electrolyte constituting the electrolyte layer, an electrolytic solution such as an aqueous electrolytic solution or a nonaqueous electrolytic solution, or a gel-like electrolyte, in which an electrolytic solution is gelated, may be used.

The positive electrode, negative electrode and solid electrolyte layer can be housed in a battery case. As the battery case, any in general form such as a coin type, plate type, cylinder type, and laminate type can be used.

In the case that the battery has a structure comprising stacked laminates comprising the positive electrode, the solid electrolyte layer and the negative electrode disposed in this order, a separator made of insulating material is disposed between the positive electrode and the negative electrode from the viewpoint of safety. As the material of the separator, for example, there may be mentioned porous films of polyethylene, polypropylene, and nonwoven fabrics such as a resin nonwoven fabric and a glass fiber nonwoven fabric.

To the collector of each electrode, a terminal, which is a connection with outside, may be provided.

EXAMPLE

Example 1

<Preparation of Alkoxide Solution>

Boric acid and TEOS were respectively dissolved or uniformly dispersed in ethanol to obtain a boric acid-ethanol solution and a TEOS-ethanol solution. The boric acid-ethanol solution and the TEOS-ethanol solution were mixed so that the element ratio of boron and silicon was 1:1. Further, liquid water was added so that the weight ratio of boric acid and liquid water was 1:4 (boric acid:liquid water), and agitated until the components come into an evenly dispersed state.

Next, an ethanol solution of anhydrous lithium acetate was prepared, and the ethanol solution was added to the solution containing boron and silicon so that the weight ratio of boric acid and anhydrous lithium acetate was 2:15 (boric acid:anhydrous lithium acetate). The amount of ethanol was adjusted so that the percentage of solid content of the solution was 6.4 wt %.

<Applying and Drying Alkoxide Solution on the Surface of Electrode Active Material>

1,610 g of the alkoxide solution obtained above was sprayed to 1 kg of positive electrode active material (LiNiMnCoO$_2$; manufactured by Nichia Corporation) and dried by means of a fluidized bed granulating-coating machine (product name: MP-01; manufactured by Powrex Corp.) for granulating and coating the powder while fluidizing powder by gas flow of inlet gas and a rotor. Thus, the surface of the positive electrode active material was covered. The conditions of spraying and drying are as follows:

atmosphere gas inside the fluidized bed container (inlet gas): dry nitrogen gas (dew-point temperature: −60° C.);

inlet gas temperature: 80° C.;

flow rate of inlet gas (intake flow rate): 0.3 m$^3$/h;

rotation rate of the rotor: 300 rpm; and spray velocity of the alkoxide solution: 4 g/min.

After covering by spraying and drying, sintering was performed at 350° C. for 5 hours. Thus, a positive electrode active material covered with a lithium ion conductive oxide (mixed glass of lithium borate/lithium silicate) was obtained.

Example 2

An alkozide solution was prepared similarly as Example 1 except that: an ethanol solution of lithium acetate dehydrate was prepared instead of the ethanol solution of anhydrous lithium acetate, the ethanol solution of lithium acetate dehydrate was added to the solution containing boron and silicon so that the weight ratio of boric acid and lithium acetate dehydrate was 2:23 (boric acid:lithium acetate dihydrate); and liquid water was not added.

A positive electrode active material covered with a lithium ion conductive oxide (mixed glass of lithium borate/lithium silicate) was obtained similarly as Example 1 using the alkoxide solution obtained.

Comparative Example 1

A positive electrode active material covered with a lithium ion conductive oxide (mixed glass of lithium borate/lithium silicate) was obtained similarly as Example 1 except that: an alkoxide solution was prepared without using liquid water; and air (dew-point temperature: 5° C.) was used instead of the dry nitrogen gas as inlet gas upon applying and drying the alkoxide solution.

<Evaluation of Positive Electrode Active Material>

(SEM Observation)

The positive electrode active materials obtained in Examples and Comparative example were observed by means of a field-emission-type scanning electron microscope (product name: ULTRA55; manufactured by ZEISS).

Figure 2:
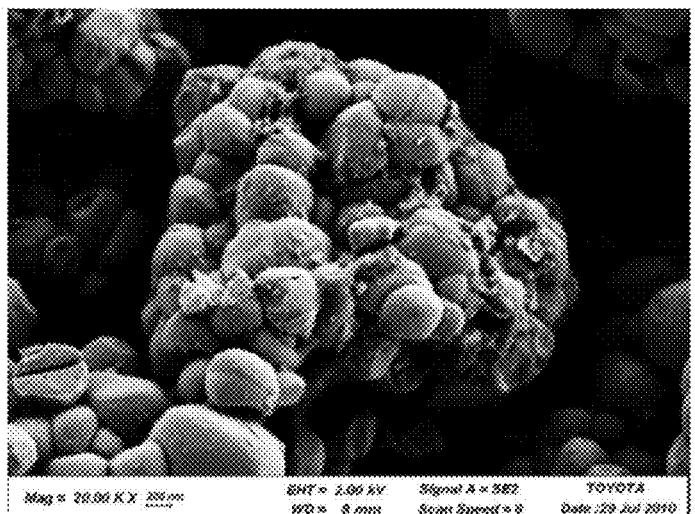
FIG. 2 is SEM images of electrode active materials in Examples 1 and 2 and Comparative example 1.
Figure 2:
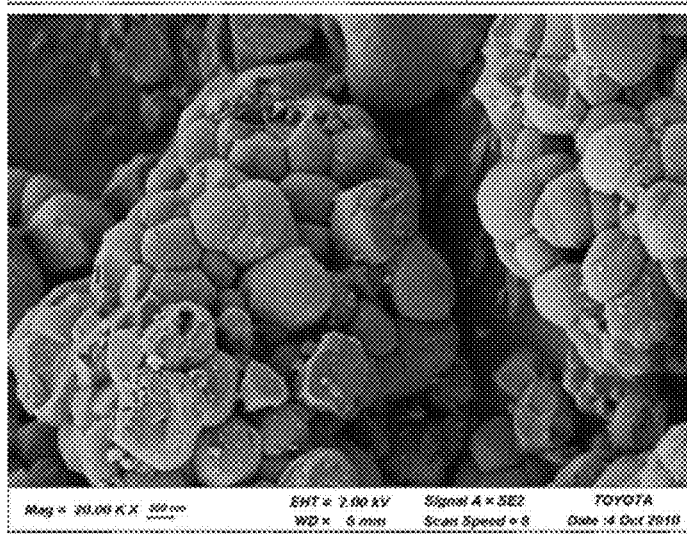
Figure 2:
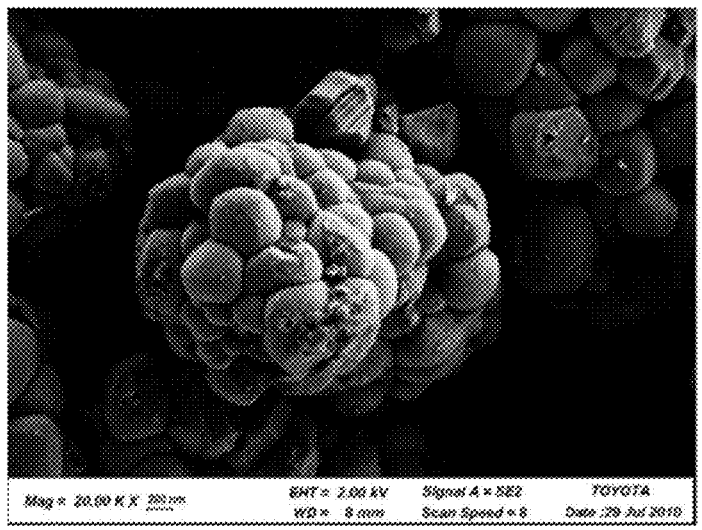

The SEM images are shown in FIG. 2 (A: Example 1; B: Example 2; and C: Comparative example 1).

In the SEM observation, the maximum particle diameter of foreign substance (other than the lithium ion conductive oxide) formed on the surface of the positive electrode active material, and the area ratio on the surface of the positive electrode active material occupied by the foreign substances were calculated. The results are shown in Table 1.

Herein, the maximum particle diameter of foreign substance is Heywood diameter. The Heywood diameter means a diameter of a circle having the same area as the projected area of particle, also called as a projected area equivalent circle diameter.

The area ratio was calculated by dividing the total projected area of foreign substances by the projected area of positive electrode active material.

As the foreign substance, it was confirmed that components other than the mixed glass of lithium borate/lithium silicate were present on the surface of the positive electrode active material by means of an energy dispersion type X-ray analysis device (product name: JED-2300; manufactured by JEOL), after drying and sintering the alkoxide solution alone under the above condition.

(Battery Evaluation)

Each of the positive electrode active material obtained in Examples and Comparative example was mixed with a sulfide-based solid electrolyte ($Li_3PS_4$) at a volume ratio of 5:5 by means of a test tube mixer until the components came into an evenly dispersed state. Thus, a mixed powder material for a positive electrode was prepared.

Separately, a negative electrode active material (layered carbon material) was mixed with a sulfide-based solid electrolyte ($Li_3PS_4$) which was the same as one used for the mixed powder material for the positive electrode at a volume ratio of 5:5, and dry mixed until the components came into an evenly dispersed state. Thus, a mixed powder material for a negative electrode was prepared.

The sulfide-based solid electrolyte ($Li_3PS_4$) was subjected to press molding to form a solid electrolyte layer.

The mixed powder material for positive electrode was disposed on one surface of the solid electrolyte layer, and the mixed powder material for negative electrode was disposed on the other surface of the solid electrolyte layer, followed by press molding. Thus, a battery in which a positive electrode active material layer, the solid electrolyte layer and a negative electrode active material layer were stacked in this order was produced.

After the obtained battery was charged until the cell voltage was 3.6 V, the cell resistances were measured by the electrochemical impedance method by means of a frequency response analyzer (product name: 1260 type; manufactured by Solartron). The results are shown in Table 1.

TABLE 1

| | | Example 1 | Example 2 | Comparative example 1 |
|---|---|---|---|---|
| Production conditions | Atmosphere gas in coating step | Nitrogen (dry) | Nitrogen (dry) | Air (wet) |
| | Addition of liquid water to alkoxide solution | Yes | No | No |
| | Hydrated water of solute in alkoxide solution | Absent | Present | Absent |
| Evaluation | Surface area ratio occupied by foreign substances (%) | 21 | 2 | 27 |
| | Maximum particle diameter of foreign substance (nm) | 632 | 169 | 777 |
| | Direct-current resistance (Ω) | 126.5 | 116.5 | 126.1 |
| | Reaction resistance (Ω) | 137.0 | 102.3 | 185.6 |

(Evaluation Results)

As shown in Table 1 and FIG. 2, the positive electrode active materials of Examples 1 and 2 have smaller surface area occupied by foreign substances and maximum particle diameter of foreign substance present on the surface compared to the positive electrode active material of Comparative example 1, and thus production of foreign substance was inhibited in Examples 1 and 2. Particularly, the area occupied by foreign substances and the maximum particle diameter of foreign substance in Example 2, in which water was added to the alkoxide solution by hydrated water of solute, were significantly smaller than those in Example 1, in which water was added to the alkoxide solution by liquid water.

As shown in Table 1, the batteries using positive electrode active materials of Examples 1 and 2 showed the direct-current resistance and reaction resistance equivalent to or lower than the battery using the positive electrode active material of the Comparative example 1. Particularly, the reaction resistance decreased significantly in Examples 1 and 2. It can be understood from these that according to the present invention, by decreasing the amount of foreign substances, the ion transfer resistance on the surface of the active material can be decreased, and decrease in internal resistance, that is, higher output, can be realized.

Example 3

<Preparation of Alkoxide Solution>

Figure 3:
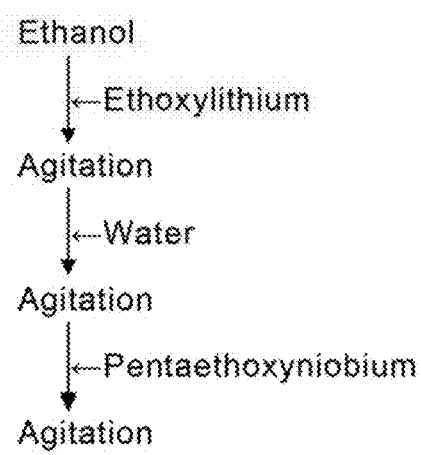
FIG. 3 is a diagram explaining an outline of production procedure of electrode active materials in Examples 3 and 4.

As shown in FIG. 3, first, ethoxylithium (manufactured by Kojundo Chemical Laboratory Co., Ltd.) was added to dehydrated ethanol (manufactured by Wako Pure Chemical Industries, Ltd.) and agitated. Next, liquid water was added to the ethoxylithium ethanol solution and agitated. Then, pentaethoxyniobium (manufactured by Kojundo Chemical Laboratory Co., Ltd.) was added to the ethoxylithium ethanol aqueous solution and agitated. Thus, an alkoxide solution was prepared. The added amounts of ethoxylithium, liquid water and pentaethoxyniobium were respectively the amounts that the concentrations of these materials in the alkoxide solution respectively become 0.47 mol/kg, 0.282 mol/kg and 0.47 mol/kg.

<Evaluation of Ion Conductive Oxide>

The aforementioned alkoxide solution prepared was applied on the surface of a comb-shaped electrode (manufactured by BSS) under dry air (dew point: −50° C.) by dip coating (10 mm/sec), and the coating solution was dried. After drying, a heat treatment was performed under air at 350° C. for 0.5 hours. Thus, a lithium niobate coated layer was formed.

Figure 4:
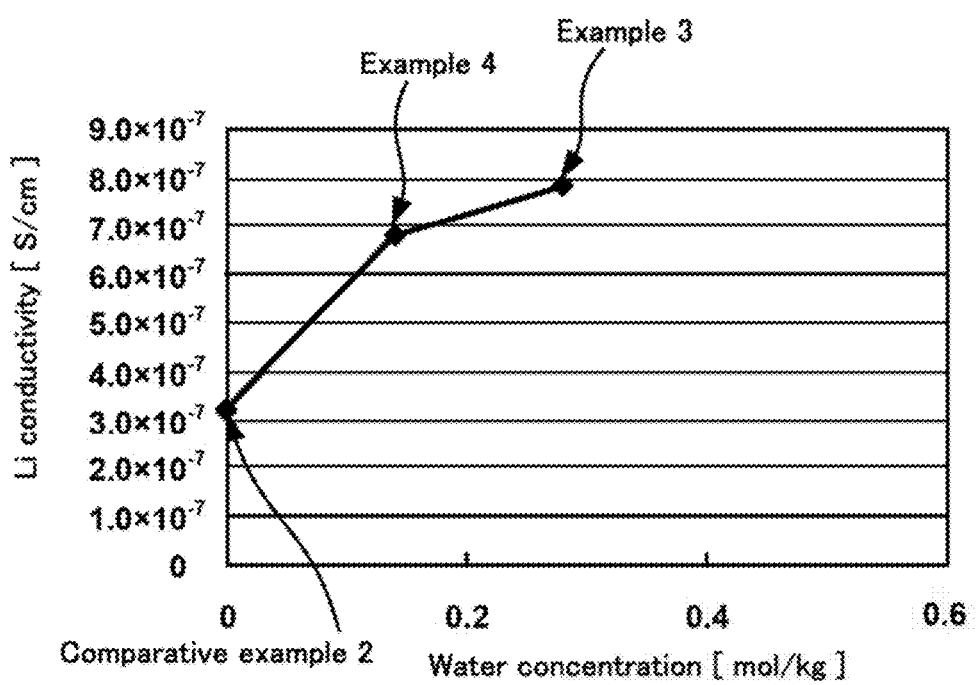
FIG. 4 is a graph showing the lithium ion conductivity of lithium ion conductive oxide coated layers formed by the alkoxide solutions in Examples 3 and 4 and Comparative example 2.

The lithium ion conductivity of the lithium niobate coated layer was measured by an alternating current impedance method. The results are shown in FIG. 4.

<Applying and Drying Alkoxide Solution to the Surface of Electrode Active Material>

The alkoxide solution was applied on a lithium cobaltate thin film (formed on an Au substrate by sputtering) by means of a spin coater (product name: MS-A100; manufactured by Mikasa Co., Ltd.) at 5,000 rpm under dry air (dew point: −50° C.) for 10 seconds, and the coating solution was dried. After drying, a heat treatment was performed under air at 350° C. for 0.5 hours. Thus, the surface of the lithium cobaltate thin film was coated with lithium niobate.

<Production of All-Solid-State Battery>

Figure 5:
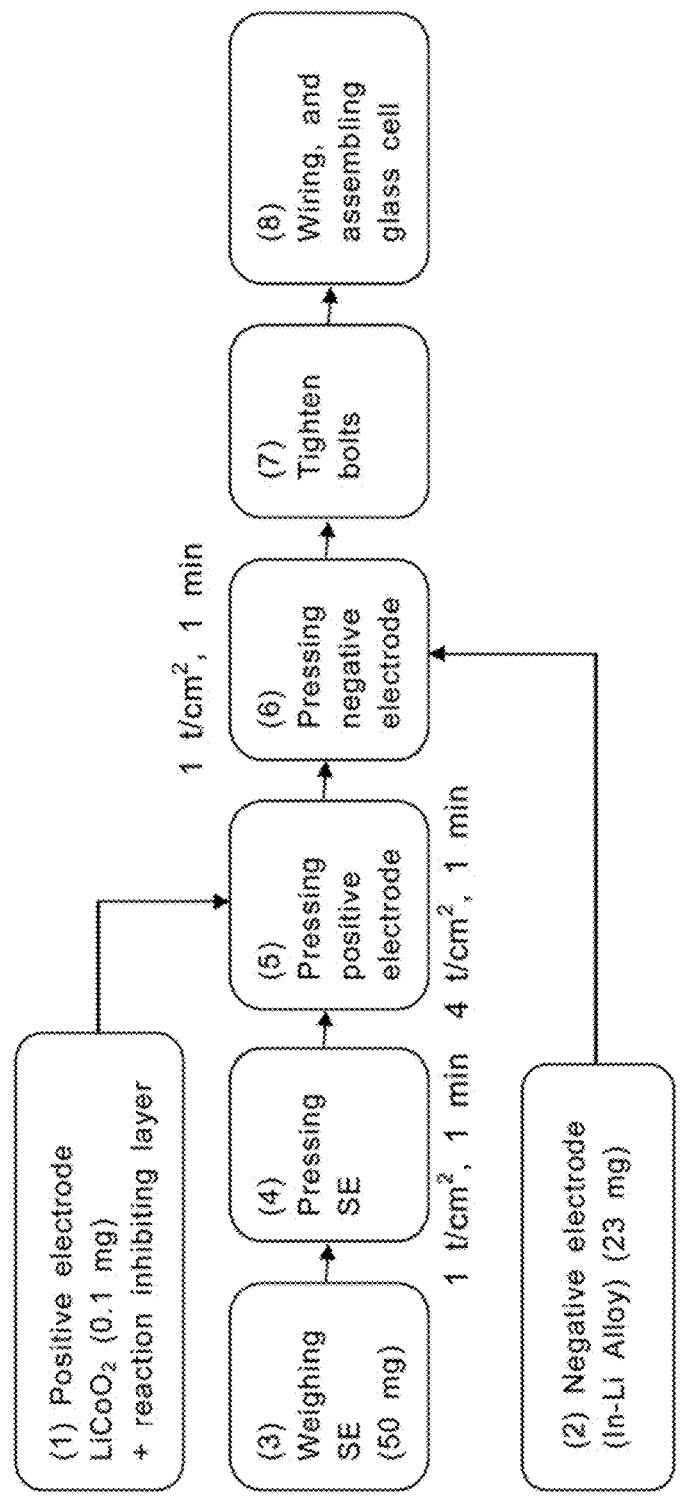
FIG. 5 is a diagram explaining an outline of production procedure of all-solid-state batteries using the electrode active materials in Example 3 and Comparative example 2.
Figure 6:
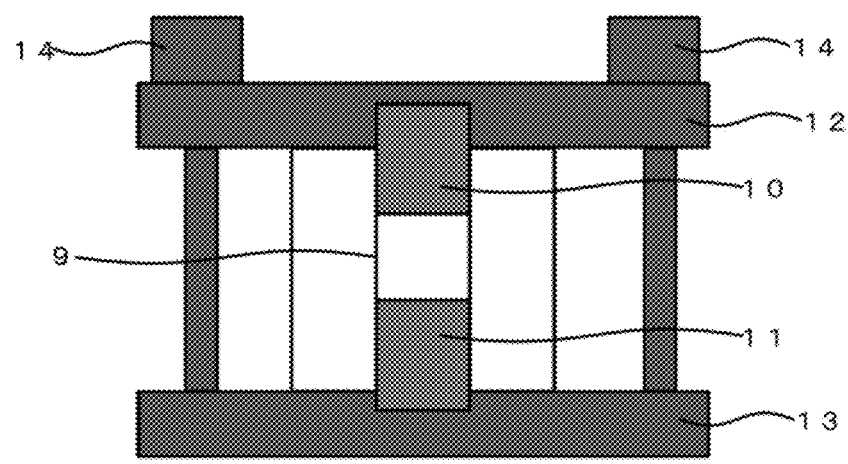
FIG. 6 is a schematic sectional view of the all-solid-state battery using the electrode active material in Example 3 or Comparative example 2.

According to the procedure shown in FIG. 5, the lithium niobate-coated lithium cobaltate thin film (containing 0.1 mg of lithium cobaltate) was used as a positive electrode, and an all-solid-state battery shown in FIG. 6 was produced. The all-solid-state battery was produced in a glove box having a dew point of −80° C. under an argon atmosphere.

That is, 50 mg of sulfide solid electrolyte ($Li_2S$—$P_2S_5$; containing $Li_2S$ and $P_2S_5$ at a weight ratio of 75:25) was weighed as a solid electrolyte (SE) and disposed between upper piston 10 and lower piston 11 inside cylinder 9, followed by pressing at 1 t/cm$^2$ for 1 minute. Thus, a solid electrolyte layer was produced. In the all-solid-state battery in FIG. 6, upper piston 10 and lower piston 11 of cylinder 9 were pressed respectively by upper base 12 and lower base 13 and pushed into the cylinder. Bases 12 and 13 and pistons 10 and 11 had conductivity.

The lithium niobate-coated lithium cobaltate thin film was disposed on the solid electrolyte layer inside the cylinder, and pressed at 4 t/cm$^2$ for 1 minute to produce a solid electrolyte layer-positive electrode assembly. The lithium niobate-coated lithium cobaltate thin film was stacked on the solid electrolyte layer so that the lithium niobate coated layer faces the solid electrolyte layer.

A negative electrode active material (In—Li alloy being a mixture of 22 mg of In and 1 mg of Li) was disposed below the solid electrolyte layer of thus obtained solid electrolyte layer-positive electrode assembly, followed by pressing at 1 t/cm$^2$ for 1 minute. Thus, a negative electrode-solid electrolyte layer-positive electrode assembly was produced.

Next, bolts 14 for fixing upper base 12 and lower base 13 were tightened. Further as shown in FIG. 7, positive electrode terminal 15 and negative electrode terminal 16 were provided to upper base 12 and lower base 13 respectively.

Figure 7:
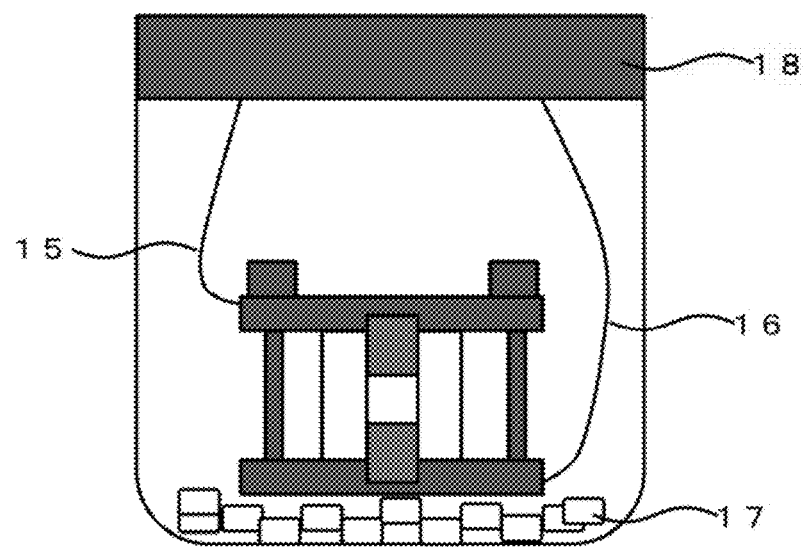
FIG. 7 is a schematic sectional view of the glass cell used for the evaluation of the electrode active materials in Example 3 and Comparative example 2.

The obtained all-solid-state battery was disposed in a glass cell, in which desiccant 17 was disposed, followed by sealing with aluminium lid 18 having an O-ring as shown in FIG. 7.

<Evaluation of All-Solid-State Battery>

Figure 8:
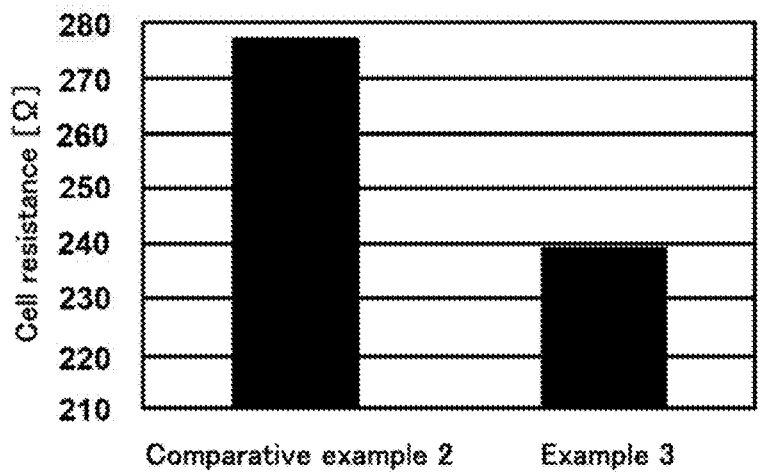
FIG. 8 is a graph showing the cell resistance values of all-solid-state batteries produced using the electrode active materials in Example 3 and Comparative example 2.

The resistance of the produced all-solid-state battery was measured. The result is shown in FIG. 8.

Example 4

An alkoxide solution was prepared similarly as Example 3 except that liquid water was used in an amount that the concentration of liquid water in the alkoxide solution was 0.141 mol/kg.

Using the obtained alkoxide solution, the lithium ion conductivity of the lithium niobate coated layer was measured similarly as Example 3. The result is shown in FIG. 4.

Comparative Example 2

An alkoxide solution was prepared similarly as Example 3 except that liquid water was not used.

Using the obtained alkoxide solution, the lithium ion conductivity of the lithium niobate coated layer was measured similarly as Example 3. The result is shown in FIG. 4.

Using the obtained alkoxide solution, an all-solid-state battery was produced and the resistance was measured similarly as Example 3. The result is shown in FIG. 8.

As shown in FIG. 4, the lithium niobate coated layers of Examples 3 and 4 are superior in lithium ion conductivity compared to the lithium niobate coated layer produced using the alkoxide solution of Comparative example 2 prepared without using liquid water. In comparison between Examples 3 and 4, the lithium niobate coated layer of Example 4 having more amount of liquid water added to the alkoxide solution has higher lithium ion conductivity.

As shown in FIG. 8, the all-solid-state battery of Example 3 has significantly lower resistance value than the all-solid-state battery of Comparative example 2, thus, it was confirmed that by addition of liquid water, the battery resistance can be lowered.

(Reference Experiment)

Figure 9:
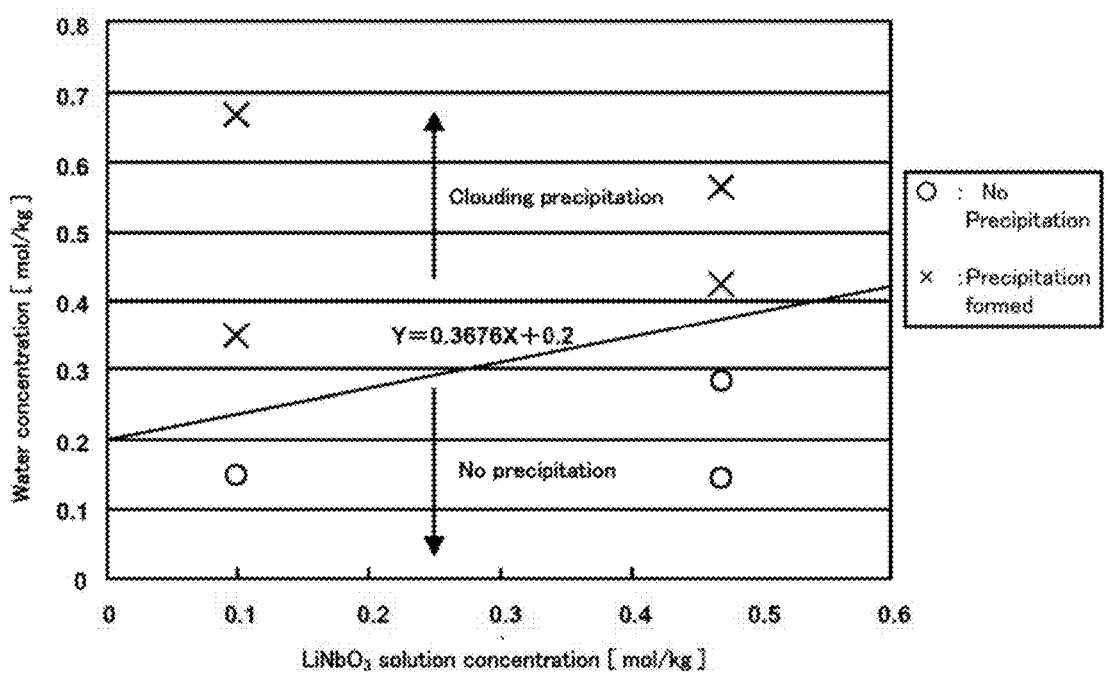
FIG. 9 is a graph showing the result of Reference experiment.

An alkozide solution (lithium niobate concentration=0.47 mol/kg) was prepared similarly as Example 3 except that the concentration of liquid water in the alkoxide solution was made to 0.423 (mol/kg) or 0.504 (mol/kg), and clouding precipitation was confirmed by sight in the alkoxide solution. The relationship between the lithium niobate concentration and the liquid water concentration in the alkoxide solution, and the clouding precipitation formation is shown in FIG. 9. In FIG. 9, "o" means there was no precipitation formation, and "x" means there was clouding precipitation formation. In FIG. 9, the results (no precipitation formation) of Examples 3 and 4 (lithium niobate concentration was 0.47 mol/kg in both examples) are shown.

Also, an alkoxide solution was prepared similarly as Example 3 except that the added amounts of ethoxylithium and pentaethoxyniobium were respectively the amounts that the concentrations of these materials in the alkoxide solution respectively become 0.1 mol/kg and 0.1 mol/kg, and the added amounts of liquid water were respectively the amounts that the concentrations of the liquid water in the alkoxide solution become 0.146 mol/kg, 0.35 mol/kg and 0.67 mol/kg, and then the presence or absence of clouding precipitation was confirmed by sight. The results are shown in FIG. 9.

It can be understood from FIG. 9 that in the case that the concentration Y of liquid water in the alkoxide solution with respect to the concentration X of lithium niobate in the alkoxide solution satisfies $Y \leq 0.3676X+0.2$, that is, in the region on or above the straight line in FIG. 9, the clouding precipitation formation can be prevented. The straight line $Y=0.3676X+0.2$ in FIG. 9 is a straight line having a slope of 0.3676 as same as a straight line connecting the points (X=0.1; Y=0.146) and (X=0.47; Y=0.282) in FIG. 9 and drawn through an intermediate position between points (X=0.1; Y=0.146) and (X=0.1; Y=0.35).

REFERENCE SIGNS LIST

1: Positive electrode
2: Negative electrode

3: Solid electrolyte layer
4: Positive electrode active material layer
5: Positive electrode collector
6: Negative electrode active material layer
7: Negative electrode collector
8: All-solid-state battery
9: Cylinder
10: Upper piston
11: Lower piston
12: Upper base
13: Lower base
14: Bolt
15: Positive electrode terminal
16: Negative electrode terminal
17: Desiccant
18: Lid

The invention claimed is:

1. A method for producing an electrode active material, a surface of which is covered with an ion conductive oxide, comprising the steps of:
  a preparation step including preparing an alkoxide solution containing no liquid water by mixing at least an alkoxide compound with a solute having at least one of hydrated water and surface adsorption water; and
  a coating step including applying and drying the alkoxide solution on the surface of the electrode active material, both the applying and the drying being performed under a dry atmosphere,
  wherein the ion conductive oxide is mixed glass of lithium borate and lithium silicate,
  wherein a total amount of the hydrated water and the surface adsorption water in the alkoxide solution in the preparation step is an amount that a number of water molecules is 1 to 10 times a unit number of RO—, wherein R is an organic group, in all alkoxide compounds added in the alkoxide solution, and
  wherein at least a lithium source, a boron source and a silicon source are mixed in the preparation step including preparing the alkoxide solution, the lithium source being at least one kind selected from the group consisting of lithium acetate dihydrate, lithium hydroxide monohydrate, a lithium sulfate hydrate and lithium carbonate having surface adsorption water, the boron source being at least one kind selected from the group consisting of boric acid, trimethoxyboron, triethoxyboron, tri-i-propoxyboron and tri-n-propoxyboron and boric acid having surface adsorption water, and the silicon source being at least one kind selected from the group consisting of tetraethoxysilane, tetramethoxysilane, tetra-i-propoxysilane, tetra-n-propoxysilane, tetra-i-butoxysilane, tetra-n-butoxysilane and tetra-t-butoxysilane.

2. The method for production according to claim 1, wherein the dry atmosphere in the coating step has a dewpoint temperature of −30° C. or less.

3. The method for production according to claim 1, wherein lithium acetate dihydrate, boric acid, tetraethoxysilane and ethanol are mixed in the preparation step including preparing the alkoxide solution.

4. The method for production according to claim 1, wherein the electrode active material is selected from the group consisting of $LiCoO_2$, $LiNiO_2$, $Li_{1+x}Ni_{1/3}Co_{1/3}O_2$, $LiMn_2O_4$, $Li_{1+x}Mn_{2-x-y}M_yO_4$ (where M is at least one element selected from the group consisting of Al, Mg, Co, Fe, Ni and Zn), $Li_xTiO_y$, $LiMPO_4$ (where M is at least one element selected from the group consisting of Fe, Mn, Co and Ni), transition metal oxides, $TiS_2$, carbon materials, LiCoN, $Li_xSi_yO_z$, lithium metal, lithium alloys, lithium storable intermetallic compounds and derivatives thereof.

5. The method for production according to claim 1, wherein the electrode active material is in the form of particles.

* * * * *